(12) United States Patent  
Simon et al.

(10) Patent No.: US 7,960,687 B1  
(45) Date of Patent: Jun. 14, 2011

(54) SOURCELESS DOWNHOLE X-RAY TOOL

(75) Inventors: Matthieu Simon, Princeton, NJ (US); Kenneth Stephenson, Princeton, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/895,463

(22) Filed: Sep. 30, 2010

(51) Int. Cl.
*G01V 5/08* (2006.01)

(52) U.S. Cl. .................................................. 250/269.1

(58) Field of Classification Search .......... 250/253–268, 250/269.1–269.8; 378/51, 53, 54, 55, 86, 378/88, 89, 90, 102, 56, 156
See application file for complete search history.

(56) References Cited

U.S. PATENT DOCUMENTS

| | | | | |
|---|---|---|---|---|
| 4,510,573 A | * | 4/1985 | Boyce et al. | 702/23 |
| 4,717,825 A | * | 1/1988 | Smith et al. | 250/256 |
| 5,054,043 A | * | 10/1991 | Lucas et al. | 378/89 |
| 5,430,785 A | * | 7/1995 | Pfoh et al. | 378/19 |
| 5,748,705 A | * | 5/1998 | Stein et al. | 378/196 |
| 7,507,952 B2 | * | 3/2009 | Groves et al. | 250/269.1 |
| 7,903,782 B2 | * | 3/2011 | Groves et al. | 378/53 |
| 2008/0265151 A1 | * | 10/2008 | Gadot | 250/261 |

* cited by examiner

*Primary Examiner* — David P. Porta
*Assistant Examiner* — Kiho Kim
(74) *Attorney, Agent, or Firm* — Jonna Flores; Darla Fonseca; Charlotte Rutherford

(57) ABSTRACT

Systems, methods, and devices relating to a sourceless X-ray downhole tool are provided. By way of example, such a downhole tool may include an X-ray generator, an X-ray detector, and data processing circuitry. The X-ray generator may emit some X-rays out of the downhole tool and some X-rays internally through the downhole tool. The X-ray detector may detect some of the X-rays that return to the downhole tool, as well as some of the X-rays that pass internally through the downhole tool. The data processing circuitry may gain-stabilize the X-ray detector based at least in part on the X-rays that passed internally through the downhole tool and were detected by the X-ray detector.

26 Claims, 8 Drawing Sheets

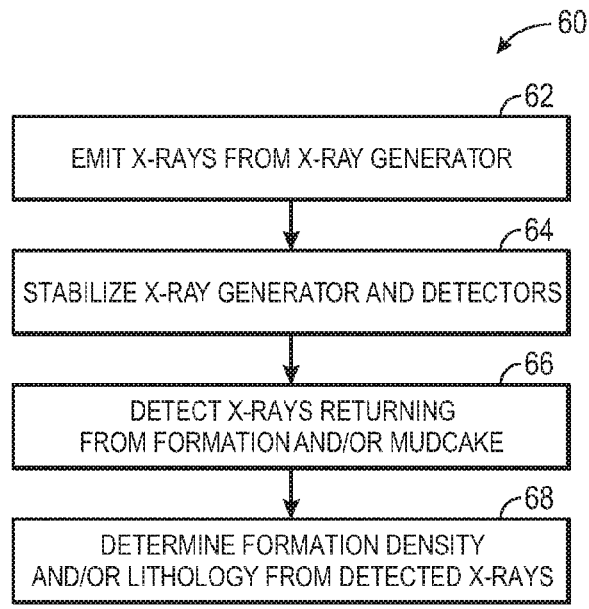
FIG. 3
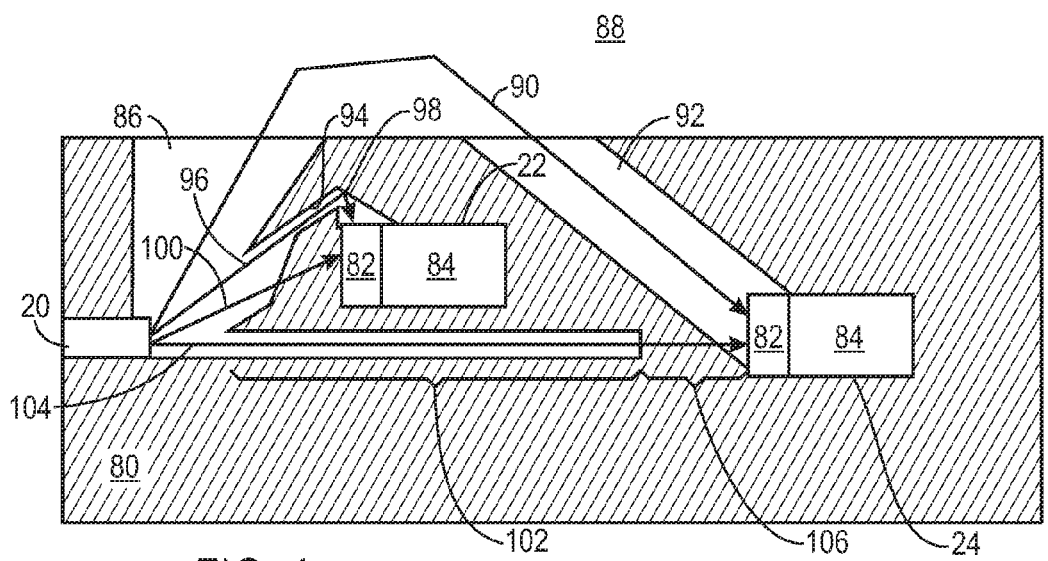
FIG. 4
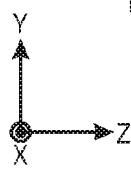

SOURCELESS DOWNHOLE X-RAY TOOL

BACKGROUND

The present disclosure relates generally to downhole well-logging tools and, more particularly, to sourceless X-ray downhole well-logging tools free of radioisotopic reference sources.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many downhole well-logging tools use emissions of radiation, such as gamma-rays, to determine a property of a subterranean formation such as lithology or density. Once emitted into the formation, the gamma-rays may interact with the formation through Compton scattering, which may attenuate the gamma-rays, and/or the photoelectric effect, which may absorb the gamma-rays. The degree to which the formation causes the gamma-rays to be Compton scattered and/or to be absorbed via the photoelectric effect may depend respectively on the density and lithology of the formation. That is, formations of various densities and lithologies will cause Compton scattering and absorption via the photoelectric effect in a predictable manner. Thus, by detecting the spectrum of gamma-rays that return to the downhole tool, the density and/or lithology of the formation may be determined.

Conventionally, such a downhole tool may emit radiation into the formation using a radioisotopic gamma-ray source, such as $^{137}$Cs. In addition, other radioisotopic gamma-ray sources of relatively low-strength (e.g., a $^{137}$Cs source of approximately 0.5-10 µCi), referred to as reference sources or stabilization sources, may be located near the radiation detectors of the downhole tool. These reference sources may emit a known amount of radiation directly at the radiation detectors. Because the sensitivity of the radiation detectors may vary and also may depend on environmental factors, which may change greatly as the downhole tool travels through the formation, the gain of the radiation detectors may be stabilized based on the radiation emitted by the reference sources. Thus, when the gamma-rays that return to the downhole tool after interacting with the formation are detected by the radiation detectors, the radiation detectors may have stable gains despite unique sensitivities or changing environmental conditions.

The use of radioisotopic sources may have several drawbacks. For example, radioisotopic sources in downhole tools may require special handling when the radioisotopic sources are inserted into or removed from the downhole tool. Additionally, these radioisotopic sources may require additional shielding during transportation and storage, as well as additional security during such transportation and storage. Indeed, in many countries, even very-low-strength radiation sources (e.g., $10^{-6}$ Ci) may be considered radioisotopic sources subject to burdensome regulations.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

Embodiments of the present disclosure relate to systems, methods, and devices for a sourceless X-ray downhole tool. By way of example, such a downhole tool may include an X-ray generator, an X-ray detector, and data processing circuitry. The X-ray generator may emit some X-rays out of the downhole tool and some X-rays internally through the downhole tool. The X-ray detector may detect some of the X-rays that return to the downhole tool, as well as some of the X-rays that pass internally through the downhole tool. The data processing circuitry may gain-stabilize the X-ray detector based at least in part on the X-rays that passed internally through the downhole tool and were detected by the X-ray detector.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a flowchart describing an embodiment of a method for carrying out the process of FIG. 2;

FIG. 4 is a schematic diagram representing a side view of a stabilization channel through shielding of the downhole tool of FIG. 1 for stabilizing the gain of a reference X-ray detector and a formation X-ray detector of the downhole tool without a radioisotopic reference source, in accordance with an embodiment;

DETAILED DESCRIPTION

Figure 1:
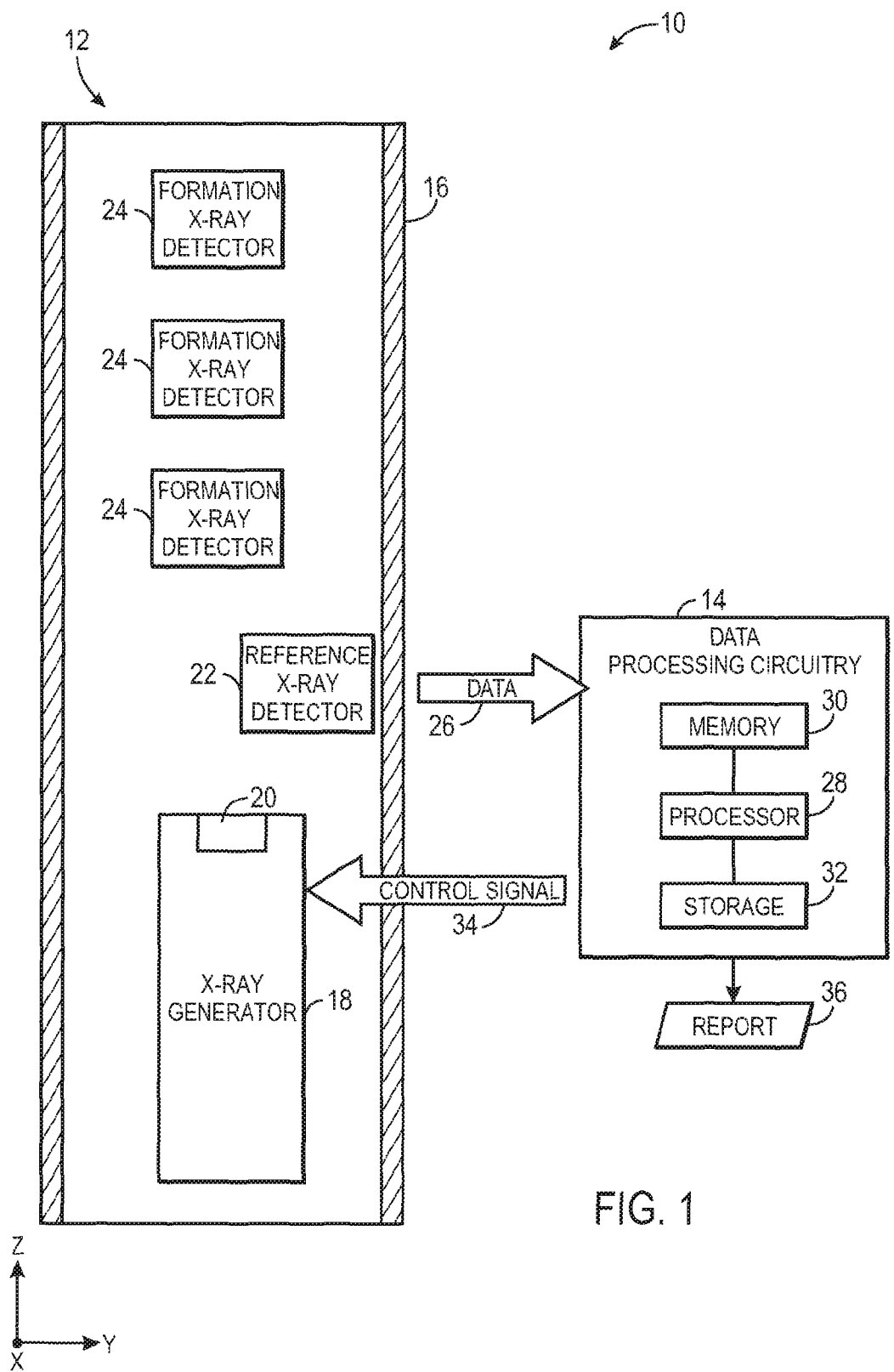
FIG. 1 is a schematic block diagram of a downhole tool free of radioisotopic reference sources, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to sourceless downhole well-logging tools that are free of radioisotopic sources. That is, as used herein, the term "sourceless" refers to a lack of radioisotopic reference sources. The term "radioactive reference source" and the like refer to a radiation source used to provide radiation to a radiation detector for stabilization purposes that is not naturally occurring in a scintillator of an X-ray detector. Such a sourceless downhole well-logging tool may employ an X-ray generator in place of a conventional radioisotopic radiation source. Radiation shielding within the downhole tool may direct some of the X-rays out of the downhole tool toward a surrounding subterranean formation, while directing other X-rays to a reference X-ray detector and one or more formation X-ray detector for gain stabilization purposes. The X-rays directed to the reference X-ray detector and one or more formation X-ray detectors may never exit the downhole tool, passing instead internally through the downhole tool. Since these internally directed X-rays indicate the current output of the X-ray generator, these X-rays may be used as a reference for stabilizing the gain of the reference X-ray detector and the one or more formation X-ray detectors, eliminating a need for any additional radioisotopic reference sources.

In various embodiments, a channel through the shielding of the downhole tool may allow the X-rays to pass internally through the downhole tool toward the one or more formation X-ray detectors. In some embodiments, this channel may include a collimating element to reduce internal reflection of X-rays in the channel. Also, at the end of the channel, some shielding may remain to serve as a high pass filter (HPF), which may cause only relatively high-energy photons to pass through to be detected by the one or more formation X-ray detectors. When the formation X-ray detector detects these reference X-rays, data processing circuitry may use the detected X-ray spectrum to adjust the gain of the formation X-ray detector without any additional radioisotopic reference sources.

With the foregoing in mind, FIG. 1 represents an embodiment of a sourceless well-logging system 10. As will be discussed below, the well-logging system 10 may determine a property of a subterranean formation, such as density or lithology, based on the Compton scattering and/or absorption due to photoelectric effect of X-rays emitted into the formation by a downhole tool 12. Data processing circuitry 14, which may determine such properties, may be located within the downhole tool 12, at the surface, or partially within the downhole tool 12 and partially at the surface. The downhole tool 12 may include a tool housing 16 that contains an X-ray generator 18 having a target 20, a reference X-ray detector 22, and any suitable number of formation X-ray detectors 24.

The X-ray generator 18 may be any suitable X-ray generator capable of emitting X-rays having a maximum energy of greater than 250 KV. For example, the X-ray generator 18 may be a high voltage X-ray generator such as that disclosed in U.S. Pat. No. 7,564,948, "HIGH VOLTAGE X-RAY GENERATOR AND RELATED OIL WELL FORMATION ANALYSIS APPARATUS AND METHOD," which is assigned to Schlumberger Technology Corporation and incorporated by reference herein in its entirety. The X-ray generator 18 may accelerate electrons toward the target 20, which may be gold (Au) in certain embodiments, to produce X-rays. These X-rays may be produced through Bremsstrahlung radiation. Bremsstrahlung radiation occurs when an electron decelerates in a strong electric field, and when an energetic electron accelerated by the X-ray generator 18 enters the target 20, this electron may encounter strong electric fields due to the other electrons present in the target 20. The energetic electron then may decelerate until it has lost all of its kinetic energy, causing the emission of an X-ray. A continuous X-ray energy spectrum may be produced when summed over many decelerated electrons. The maximum X-ray energy will be equal to the total kinetic energy of the energetic electron, and the minimum X-ray energy in the observed Bremsstrahlung spectrum will be that of X-rays just able to exit the target 20 of the X-ray generator. In some embodiments, the X-ray target 20 may emit an X-ray spectrum that peaks at approximately 75% of the maximum beam energy (e.g., approximately 300 keV when the maximum beam energy is 400 keV or approximately 225 keV when the maximum beam energy is 300 keV).

As will be discussed below, some X-rays from the X-ray generator 18 may exit the target 20 and pass into materials that surround the downhole tool 12, such as a surrounding subterranean formation. Other of the X-rays from the X-ray generator 18 may exit the target 20 and pass internally through the downhole tool to serve as a reference to both the reference X-ray detector 22 and the formation X-ray detectors 24. The internally directed X-rays detected by the reference X-ray detector 22 may be used to stabilize the reference X-ray detector 22 and to stabilize the output of the X-ray generator 18. The internally directed X-rays detected by the formation X-ray detectors 24 may be used to stabilize the formation X-ray detectors 24. Thus, when the formation X-ray detectors 24 detect X-rays that have exited the downhole tool 12 and subsequently returned to the downhole tool 12, the formation X-ray detectors 24 may remain accurate despite changes in environmental conditions that could affect the sensitivity of the formation X-ray detectors 24 and/or changes in X-ray generator 18 output. The responses of the reference X-ray detector 22 and the formation X-ray detectors 24 to the X-rays may be processed by the data processing circuitry 14, and are schematically referred to in FIG. 1 as data 26.

The data processing circuitry 14 may receive the data 26 and perform certain processing to stabilize the gain of the reference X-ray detector 22, to stabilize the output of the X-ray generator 18, and to stabilize the gain of the formation X-ray detectors 24. The data processing circuitry 14 may include a processor 28, memory 30, and/or storage 32. The processor 28 may be operably coupled to the memory 30 and/or the storage 32 to carry out the presently disclosed techniques. These techniques may be carried out by the processor 28 and/or other data processing circuitry based on certain instructions executable by the processor 28. Such instructions may be stored using any suitable article of manufacture, which may include one or more tangible, computer-readable media to at least collectively store these instructions. The article of manufacture may include, for example, the memory 30 and/or the nonvolatile storage 32. The memory 30 and the nonvolatile storage 32 may include any suitable articles of manufacture for storing data and executable instructions, such as random-access memory, read-only memory, rewriteable flash memory, hard drives, and optical disks.

The downhole tool 12 may transmit the data 26 to the data processing circuitry 14 via, for example, internal connections within the tool, a telemetry system communication downlink, and/or a communication cable. After receiving the data 26, the data processing circuitry 14 may determine a control signal 34 to stabilize the output of the X-ray generator 18, as discussed below. In addition, the data processing circuitry 14 may stabilize the gain of the formation X-ray detectors 24 and determine one or more properties of the subterranean formation that surrounds the downhole tool 12. By way of example, such a formation property may include a photoelectric effect relating to a lithology of the formation and a bulk density of the formation. Thereafter, the data processing circuitry 14 may output a report 36 indicating the one or more ascertained properties of the formation. The report 36 may be stored in memory or may be provided to an operator via one or more output devices, such as an electronic display.

Figure 2:
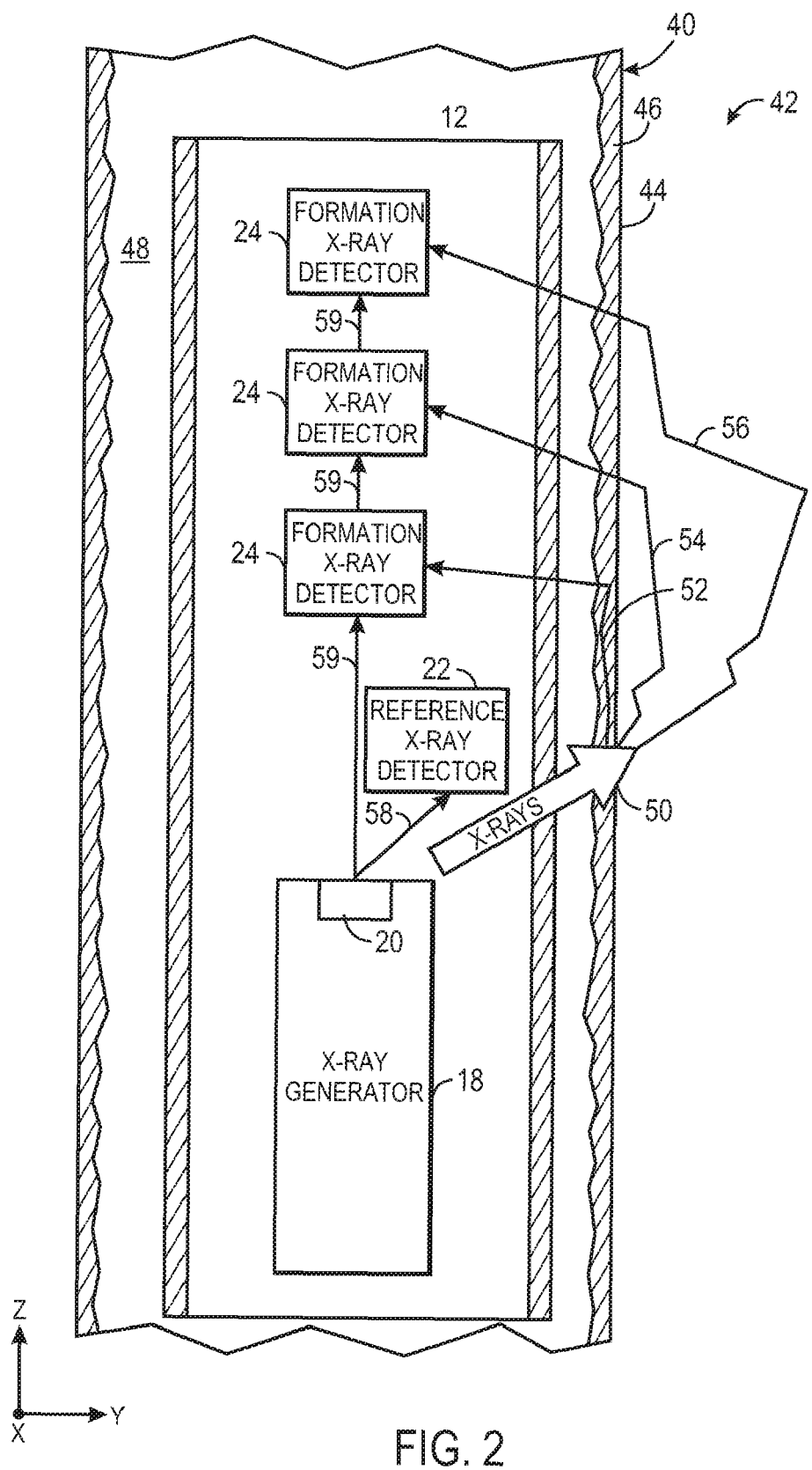
FIG. 2 is a schematic block diagram representing the use of the downhole tool of FIG. 1 to determine a property of a subterranean formation, in accordance with an embodiment.

When lowered into a borehole 40 in a formation 42, as shown in FIG. 2, the downhole tool 12 may be used to determine one or more properties of the formation 42. The downhole tool 12 may be lowered into the borehole 40 using any suitable means of conveyance, such as wireline, logging while drilling (LWD), or coiled tubing. As shown in FIG. 2, the borehole 40 may or may not include a casing 44 and may or may not include a residual mudcake 46. Such a residual mudcake 46 may remain following the drilling process, when the borehole 40 may be filled with drilling mud. The liquid portion of the drilling mud may flow into the formation 42, leaving behind a deposit layer of solid mud material on the interior wall of the borehole in the form of the mudcake 46. The downhole tool 12 may be surrounded while in the borehole 40 with a borehole fluid 48.

The X-ray generator 18 may emit X-rays 50 from the target 20. These X-rays 50 may be directed by shielding in the downhole tool, which is described in greater detail below with reference to FIGS. 4 and 5. Some of the X-rays 50 may exit the downhole tool 12 toward the materials surrounding the tool, such as the mudcake 46, the casing 44, and/or the formation 42. The X-rays 50 may interact with these materials via Compton scattering and the photoelectric effect.

The degree to which these materials cause the X-rays 50 to Compton scatter and/or be absorbed via the photoelectric effect may impact the spectrum of X-rays that will return to the downhole tool 12 to be detected by the formation X-ray detectors 24. In particular, due to these interactions, some of the X-rays 50 may take X-ray paths such as those illustrated as numerals 52, 54, and 56. Depending on the distance from the target 20 to the formation X-ray detectors 24, and/or the angle at which the X-rays 50 are emitted from the downhole tool 12, the various formation X-ray detectors 24 may measure the returning X-rays at different depths of investigation (DOI) from the downhole tool 12. For example, the formation X-ray detector 24 closest to the target 20 of the X-ray generator 18 will generally detect X-rays taking a path (e.g., X-ray path 52) closer to the downhole tool 12, while the formation X-ray detector 24 furthest from the target 20 will generally detect X-rays taking a path (e.g., X-ray path 56) farther from the downhole tool 12.

As noted above, some of the X-rays 50 may exit the downhole tool 12, but certain other of the X-rays 50 may pass internally through the downhole tool 12 without interacting with any surrounding materials. Such X-rays 50 may travel, for example, via internal X-ray paths 58 and 59 respectively to the reference X-ray detector 22 and the formation X-ray detectors 24. As will be discussed in greater detail below, the X-rays that travel through the X-ray paths 58 and 59 may serve as a reference to the reference X-ray detector 22 and the formation X-ray detectors 24 to enable the reference X-ray detector 22, the output of the X-ray generator 18, and the formation X-ray detectors 24 to be stabilized without any additional radioisotopic reference sources.

As the downhole tool 12 moves through different parts of the formation 42, the environmental conditions surrounding the downhole tool 12 may change rapidly. For example, temperature or pressure may rapidly increase or decrease. Such changes in environmental conditions may impact the sensitivity of the formation X-ray detectors 22 and 24. Moreover, even under the same environmental conditions, the formation X-ray detectors 24 may have different sensitivities. Thus, before the X-rays detected by the formation X-ray detectors 24 are used to determine a property of the formation 42, the formation X-ray detectors 24 may be gain-stabilized using the portion of the X-rays 50 that travel internally through the downhole tool 12 (e.g., along X-ray path 59).

Thus, as shown by a flowchart 60 of FIG. 3, the well-logging operation described with reference to FIG. 2 may involve certain system stabilization using the X-rays detected from the X-ray paths 58 and 59. For example, the X-ray generator 18 first may begin emitting X-rays (block 62), which may provide a basis for stabilizing the gain of the reference X-ray detector 22, the output of the X-ray generator 18, and the gain of the formation X-ray detectors 24 (block 64). The individual elements of block 64 are described in greater detail below. With the X-ray generator 18 and the X-ray detectors 24 stabilized, the X-ray detectors 24 may detect gain-stabilized X-ray spectra due to the X-rays that return to the downhole tool 12 (block 66). With these X-ray spectra, the formation density and/or lithology of the formation 42 may be determined using any suitable technique (block 68).

FIG. 4 illustrates a manner in which X-ray shielding 80 in the downhole tool 12 may control the direction the X-rays 50 travel out of the downhole tool 12 toward the formation 42, as well as through the downhole tool 12 toward the various X-ray detectors 22 and 24 for system stabilization purposes. Such X-ray shielding 80 may include, for example, tungsten (W) or lead (Pb). The reference X-ray detector 22 and the formation X-ray detectors 24 may be embedded within the X-ray shielding 80. As represented in FIG. 4, each of the X-ray detectors 22 and 24 includes a scintillator 82 and a photomultiplier tube (PMT) 84.

The X-ray shielding 80 may include an exit channel 86, through which X-rays may exit the downhole tool 12 and enter surrounding materials 88. When the downhole tool 12 is used in the borehole 40, these surrounding materials 88 may include, for example, the mudcake 46, casing 44, and the formation 42. The X-rays that leave the exit channel 86 may interact with the surrounding materials 88, returning to the downhole tool via, for example, an X-ray path 90. The X-ray path 90 may reenter the downhole tool 12 through a formation X-ray detector channel 92. X-rays traveling along a path such as the X-ray path 90 may be detected by the scintillator 82 of the formation X-ray detector 24. The scintillator 82 may produce an amount of light that corresponds to the spectrum of X-rays reaching the scintillator 82. The PMT 84 may convert the light from the scintillator into an electrical signal that corresponds to the spectrum of X-rays detected by the formation X-ray detector 24.

Simply detecting the X-rays that reenter the downhole tool along a path such as the X-ray path 90 may not yield sufficient information to determine a property of the surrounding materials 88 if the output of the X-ray generator 18 is not stabilized. As such, the reference X-ray detector 22 may employ X-rays emitted from the target 20 of the X-ray generator 18 both to gain-stabilize its own operations and to stabilize the operations of the X-ray generator 18. Specifically, some X-rays from the target 20 of the X-ray generator 18 may pass through an internal channel 94 in the X-ray shielding 80, as shown by an X-ray path 96, which may impact the X-ray shielding 80 at the location indicated by a numeral 98. When the X-rays impact the X-ray shielding 80 at numeral 98, the X-ray shielding 80 may fluoresce, emitting X-rays of approximately 80 keV that may be detected by the scintillator 82 of the reference X-ray detector 22. Simultaneously, X-rays from the target 20 may travel along another X-ray path 100, through the X-ray shielding 80, to reach the scintillator 82 of the reference X-ray detector 22. The X-ray shielding 80 may serve as a high pass filter (HPF), largely eliminating lower-energy X-rays and allowing some of the higher-energy X-rays to pass. In other embodiments, materials other than the X-ray shielding 80 may serve as a high-pass filter. In some embodiments, the X-ray target 20 may emit an X-ray spectrum that peaks at approximately 75% of the maximum beam energy (e.g., approximately 300 keV when the maximum beam energy is 400 keV or approximately 225 keV when the maximum beam energy is 300 keV), this spectral peak may be detected by the scintillator 82 of the reference X-ray detector 22. Thus, the reference X-ray detector 22 may detect two distinct peaks (e.g., 80 keV from X-ray fluorescence at numeral 98 and 75% of the maximum beam energy of the X-ray generator 18 from X-ray path 100). As will be described below, these two distinct energy peaks may enable the data processing circuitry 14 to stabilize both the reference X-ray detector 22 and the X-ray generator 18.

Since the gain of the formation X-ray detector 24 may vary depending on the current environmental conditions (e.g., temperature or pressure), the gain of the formation X-ray detector 24 may be stabilized to ensure consistent X-ray detection through the borehole 40. Rather than rely on a radioisotopic reference source, the formation X-ray detector 24 may be stabilized based on X-rays from the X-ray generator 18 passing internally through the downhole tool 12. In particular, a gain-stabilization channel 102 in the X-ray shielding 80 may allow X-rays to pass internally through the downhole tool 12 along an X-ray path 104. In certain embodiments, the gain-stabilization channel 102 may terminate prior to reaching the formation X-ray detector 24, and the X-ray path 104 may pass through a filter 106 made of the X-ray shielding 80. This shielding 106 may serve as a high pass filter (HPF) that may result in a distinct high-energy peak of X-rays detected by the formation X-ray detector 24. In other embodiments, the gain-stabilization channel 102 may continue to the formation X-ray detector 24 and the filter 106 may not be present. As will be discussed below, the high-energy peak of X-rays arriving to the formation X-ray detector 24 via the gain-stabilization channel 102 in the X-ray shielding 80 may be used to gain-stabilize the formation X-ray detector 24.

Figure 5:
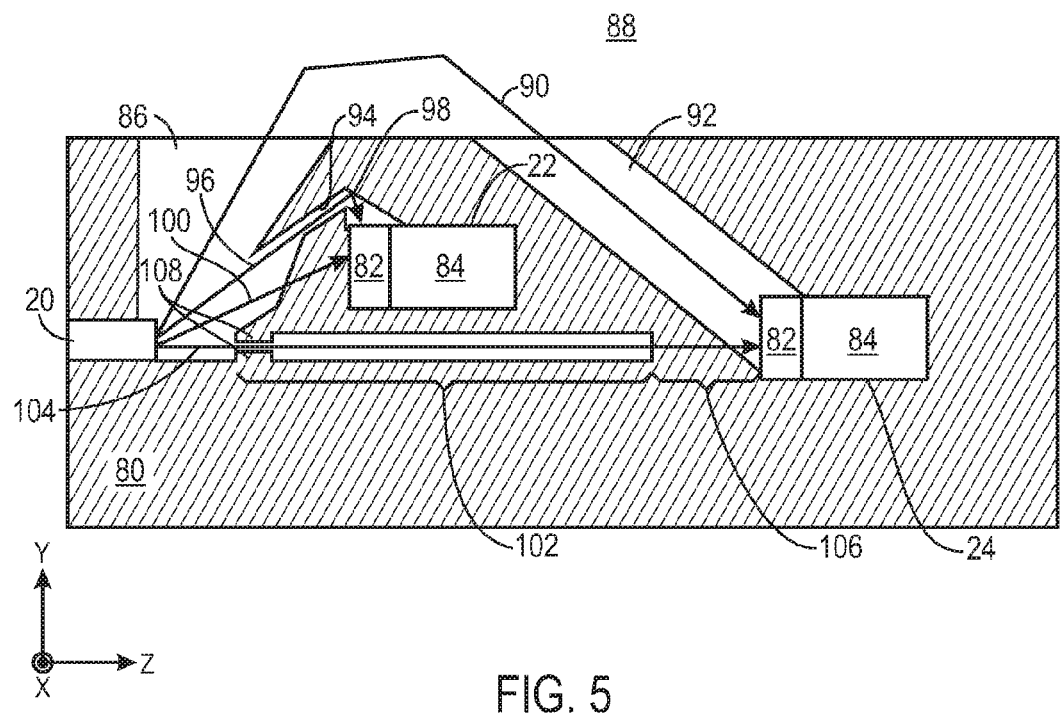
FIG. 5 is a schematic diagram representing a side view of the stabilization channel having collimating shielding, in accordance with an embodiment.

In certain embodiments, the gain-stabilization channel 102 may be collimated to reduce incident reflection in the gain-stabilization channel 102. As shown in FIG. 5, which includes all elements shown in FIG. 4, the X-ray shielding 80 may additionally include a collimating element 108 in the gain-stabilization channel 102. This collimating element 108 may be formed from the X-ray shielding 80 to collimate the X-rays traveling generally along the X-ray path 104.

Figure 6:
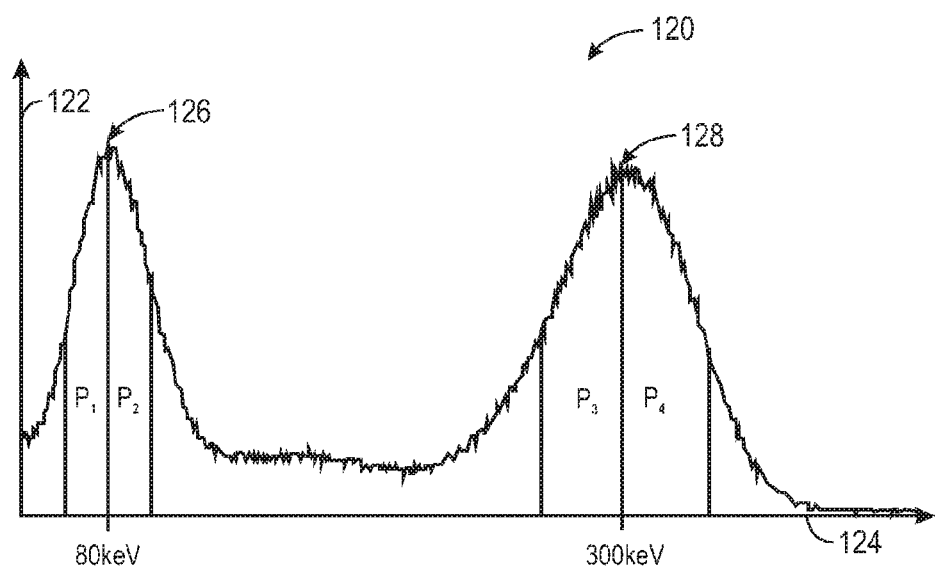
FIG. 6 is a plot modeling a spectrum of X-rays detected by the reference X-ray detector shown in FIG. 1, in accordance with an embodiment.

As mentioned above, the reference X-ray detector 22 may detect two distinct energy peaks: a first peak derived from the X-ray path 96, which impacts the X-ray shielding 80 at reference numeral 98, causing fluoresce at 80 keV, and a second peak derived from the X-ray path 100, which may produce a higher energy peak corresponding to the current output of the X-ray generator 18. A plot 120 of FIG. 6 models such a dual-peak X-ray energy spectrum detected by the reference X-ray detector 22. In the plot 120, an ordinate 122 represents X-rays detected by the reference X-ray detector 22 in units of counts per second (cps), and an abscissa 124 represents the energy of these X-rays in units of keV. A first energy peak 126, occurring around 80 keV, represents X-rays caused by X-ray fluorescence in the X-ray shielding 80 at reference numeral 98. A second energy peak 128, occurring around 75% of the current maximum beam energy of the X-ray generator 18, represents X-rays caused by Bremsstrahlung radiation from the X-ray target 20, as filtered by the X-ray shielding along the X-ray path 100. The second energy peak 128 is shown in FIG. 6 as occurring 300 keV because the X-ray generator 18 is modeled as currently having a maximum beam energy of 400 keV. However, this second energy peak 128 may be located at other energies, depending on the current maximum beam energy of the X-ray generator 18. As will be discussed below, the presence of the two energy peaks 126 and 128 may enable the stabilization of the reference X-ray detector 22 and the stabilization of the X-ray generator 18.

Figure 7:
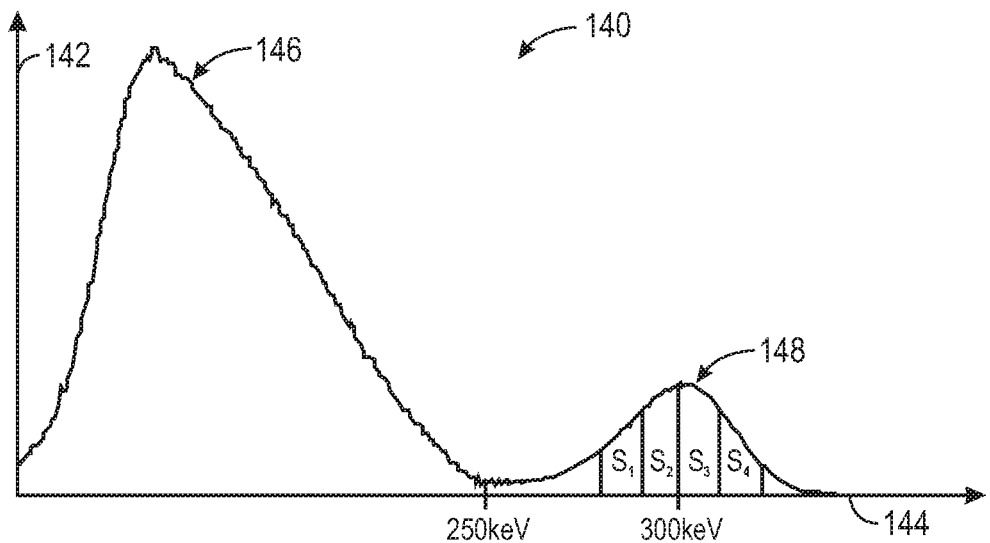
FIG. 7 is a plot modeling a spectrum of X-rays detected by a formation X-ray detector of FIG. 1, in accordance with an embodiment.

The spectrum detected by the formation X-ray detector 24 of FIG. 4 or 5 also may include X-rays arriving from two distinct paths: one set of X-rays that returns to the downhole tool 12 through the formation X-ray detector channel 92 after passing through the external materials 88 and another set of X-rays passing internally through the downhole tool through the gain-stabilization channel 102. A plot 140 of FIG. 7 models such a scenario. In the plot 140, an ordinate 142 represents X-rays detected by the formation X-ray detector 24 in units of counts per second (cps), and an abscissa 144 represents X-ray spectrum energy in units of keV. X-rays arriving at the formation X-ray detector 24 from outside of the downhole tool 12 are primarily responsible for a first energy peak 146. By contrast, X-rays arriving at the X-ray detector 24 internally through the downhole tool 12 are primarily responsible for a second energy peak 148, also referred to as a reference peak. Although FIG. 7 shows the reference peak 148 as occurring at 300 keV because the X-ray generator 18 is modeled as currently having a maximum beam energy of 400 keV, the reference peak 148 may be located at other energy levels depending on the current maximum beam energy of the X-ray generator 18. Because the reference peak 148 should be stable when the output of the X-ray generator 18 is stable, the reference peak 148 may be used as a reference for gain stabilizing the formation X-ray detector 24.

Figure 8:
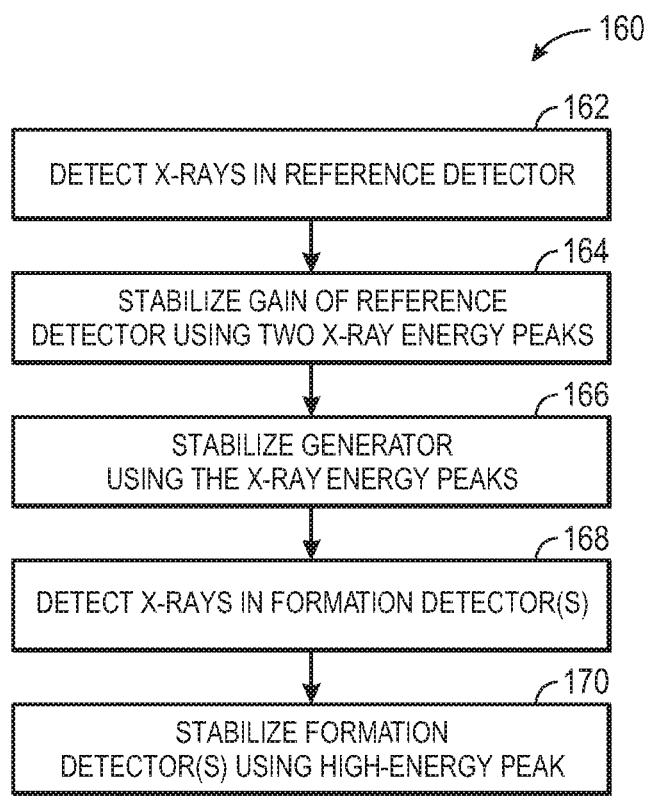
FIG. 8 is a flowchart describing an embodiment of a method for stabilizing the gain of the downhole tool of FIG. 1 without any radioisotopic reference sources external to a scintillator of the detector.

A flowchart 160 of FIG. 8 represents one embodiment of a method for stabilizing the reference X-ray detector 22, the X-ray generator 18, and the formation X-ray detector(s) 24. The flowchart 160 may begin when the X-ray generator 18 causes the X-ray target 20 to emit X-rays, some of which will travel along the X-ray paths 96 and 100 to be detected by the reference X-ray detector 22 (block 162). The reference X-ray detector 22 may detect an X-ray spectrum, such as that shown in FIG. 6 and discussed above.

Based on such a spectrum detected by the reference X-ray detector 22, the data processing circuitry 14 first may stabilize the gain of the reference X-ray detector 22 based on the two energy peaks 126 and 128 (block 164). Specifically, the offset and the gain of the reference X-ray detector 22 can be tuned such that the windows P1-P4 (FIG. 6) keep the ratios of $$\frac{p_1 - p_2}{p_1 + p_2}$$

and $$\frac{p_3 - p_4}{p_3 + p_4}$$

close to zero. It should be understood that, in other embodiments, the data processing circuitry 14 instead may use a function fit other than the windows P1-P4. For example, the data processing circuitry 14 may, additionally or alternatively, employ a Gaussian or polynomial function fit.

Having stabilized the reference X-ray detector 22, the data processing circuitry 14 next may stabilize the X-ray generator 18 output (block 166). That is, the energy windows P1, P2, P3, and P4 may be measured. The data processing circuitry 14 next may regulate the voltage of the accelerator used in the X-ray generator 18 based on a ratio of the second energy peak 128 windows to the first energy peak 126 windows $$\frac{p_3 + p_4}{p_1 + p_2}.$$

The beam current of the X-ray generator 18, which may determine the quantity of X-rays emitted by the X-ray generator 18, may be stabilized using the total counts measured (e.g., $EP_i$). In some embodiments, a different method may be used to stabilize the output of the X-ray generator 18 based on the relationship between $\{p_1+p_2, p_3+p_4\}$ and {accelerator voltage, beam current}, since this relationship is a bijection (i.e., only one pair of counts will be present for one given voltage and current).

By the end of block 166, the X-ray generator 18 should be stabilized at a known end-point energy (due to the accelerator voltage of the X-ray generator 18) and at a known flux (due to the beam current of the X-ray generator 18). Next, the formation X-ray detector 24 may detect X-rays that return to the downhole tool 12 from outside of the downhole tool 12 and X-rays that pass internally through the downhole tool 12 through the gain-stabilization channel 102, resulting in an energy spectrum such as that shown by the plot 140 of FIG. 7, as discussed above (block 168).

Figure 9:
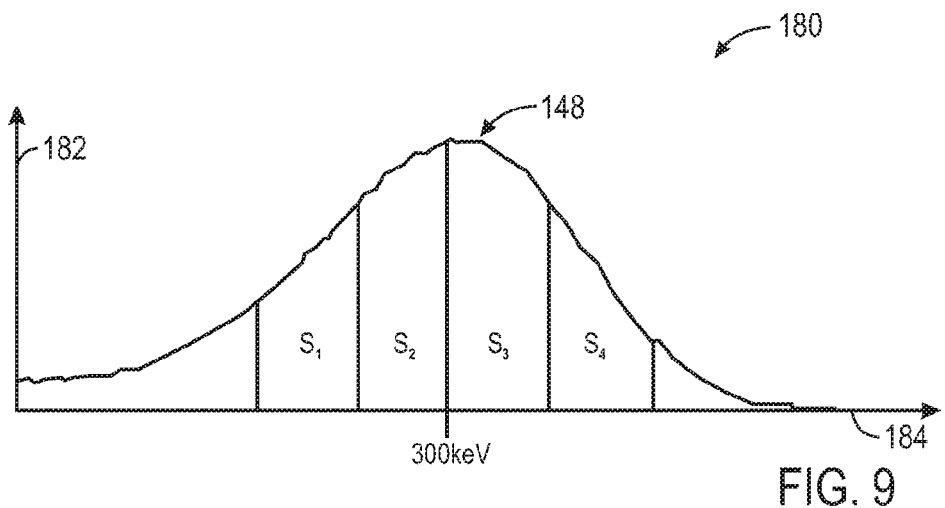
FIG. 9 is a plot modeling a spectrum of X-rays detected by a formation X-ray detector through the stabilization channel of the downhole tool, in accordance with an embodiment.

Based on such an energy spectrum, the data processing circuitry 14 may stabilize the gain of the formation X-ray detector 24 (block 170). In particular, as noted above with reference to FIG. 7, the reference peak 148 will occur at known end-point energy because the X-ray generator 18 is stabilized at known end-point energy. The reference peak 148 may be used to stabilize the gain of the formation X-ray detector 24 using any suitable technique. For example, the reference peak 148 may be divided into 4 windows, labeled S1, S2, S3, and S4, as shown by a plot 180 of FIG. 9, which illustrates a closer view of the reference peak 148 shown in the plot 140 of FIG. 7. In the plot 180, an ordinate 182 represents X-rays in counts per second (cps), and an abscissa 184 represents X-ray energy in units of keV. The origin of the plot 180 begins at approximately 250 keV, so as to focus on the reference peak 148. To stabilize the gain of the formation X-ray detector 24, the reference peak 148 may be defined by the four windows S1, S2, S3, and S4. In general, the gain of the formation X-ray detector 24 may be adjusted by the data processing circuitry 14 such that the number of counts in window S2 is equal to the counts of the window S3. To account for pile-up effects, a linear background reading may be subtracted from the reference peak 148. Such a background reading may be estimated using the S1 and S4 windows, and may be applied in a reference peak 148 form factor (FF) equation:

$$FF = \frac{\left(S2 - \frac{S1-S4}{3}\right) - S3}{\left(S2 - \frac{S1-S4}{3}\right) + S3}.$$

Based on the value of the form factor, the gain of the formation X-ray detector 24 may be adjusted up or down such that the FF equation is driven to zero. That is, a positive FF yields an increase in the gain of the formation X-ray detector 24, while a negative FF yields a decrease in the gain.

In some embodiments, the scintillator 82 may produce its own background radiation, which may supplement the above-described gain-stabilization techniques. In particular, certain scintillators 82 are available for use that contains traces of radioactive elements. While the presence of such radioactive elements may be undesirable for certain applications (e.g., measuring very low levels of gamma-rays), the background radiation signals generated by the internal radioactivity of such scintillators 82 can be used to supplement gain stabilization in the formation X-ray detector 24 of the downhole tool 12. Such a scintillator may represent, for example, a scintillator based at least in part on Lutetium Silicate (LSO), Lutetium Aluminum Perovskite (LuAP), Lutetium Aluminum Garnet (LuAG), or Lanthanum (La). Alternatively, the scintillator may represent any other scintillator containing a naturally occurring radioactive isotope such as, for example, Bismuth Germanium Oxide (BGO) containing $^{207}$Bi.

Figure 10:
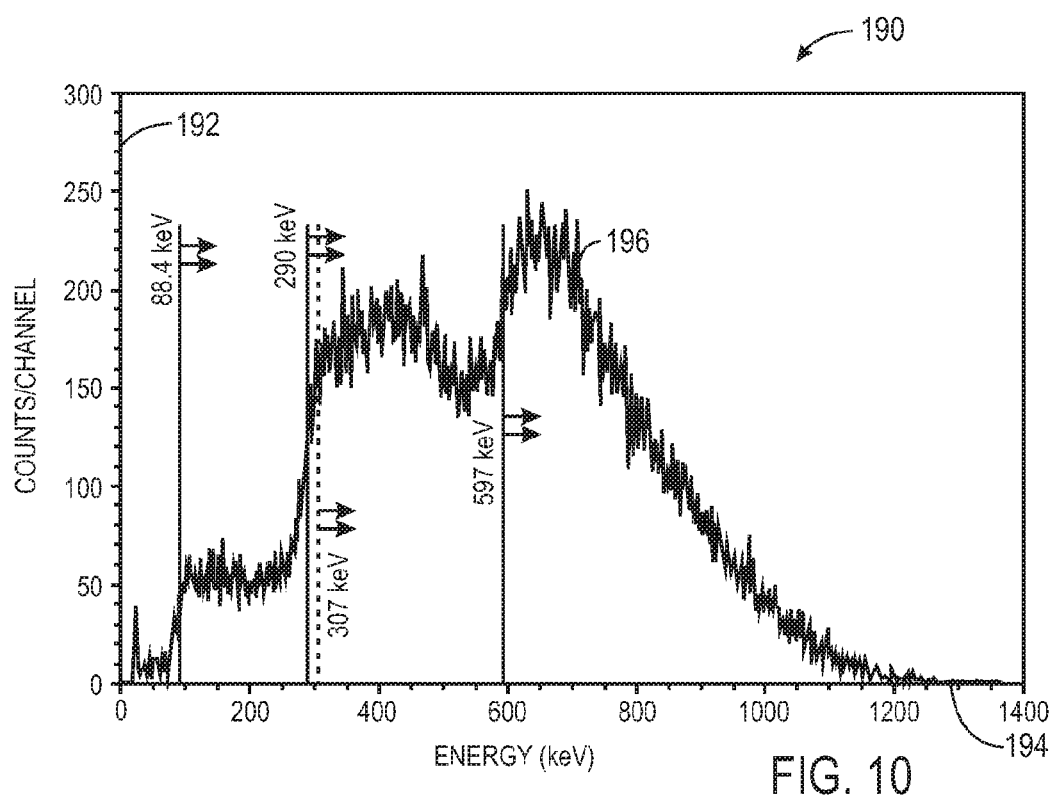
FIG. 10 is a plot modeling a spectrum of X-rays produced through a natural background radiation of a scintillator of the formation X-ray detector, in accordance with an embodiment.
Figure 11:
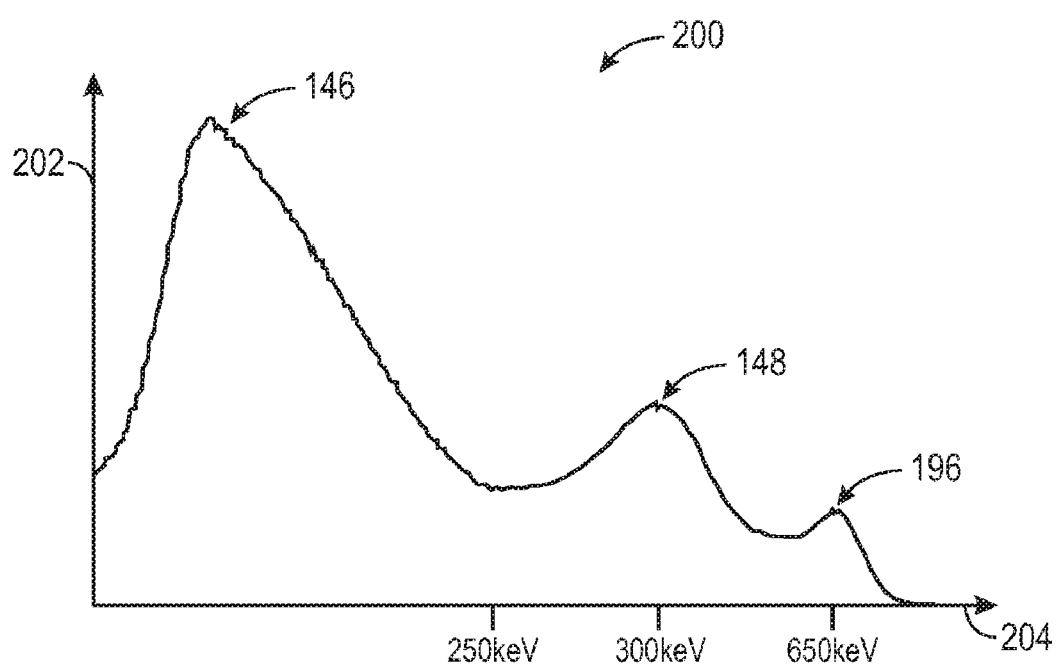
FIG. 11 is a plot modeling a spectrum of X-rays detected by a formation X-ray detector of the downhole tool of FIG. 1 when the scintillator of the formation X-ray detector produces a natural background radiation, in accordance with an embodiment.

One example of background radiation that may occur in a scintillator 82 having a LuAP crystal appears in a plot 190 of FIG. 10. In the plot 190, an ordinate 192 represents counts per channel, and an abscissa 194 represents energy in units of keV. An energy peak 196 is generally distributed between approximately 300 keV and about 800 keV, which is higher than the reference peak 148 that is due to the Bremsstrahlung X-rays traveling through the gain stabilization channel 102 to reach the formation X-ray detector 24. That is, as modeled by a plot 200 of FIG. 11, the total X-ray spectrum detected by a formation X-ray detector 24 having a scintillator 82 that includes LuAP may include the first peak 146, the reference peak 148, as well as the background radiation peak 196. The plot 200 includes an ordinate 202 representing counts per second and an abscissa 204 representing energy in units of keV. In FIG. 11, the reference peak 148 is modeled as occurring around 300 keV because the X-ray generator 18 is modeled as having a current maximum beam energy of approximately 400 keV. In other embodiments, the reference peak 148 may occur at different energies, depending on the current maximum beam energy of the X-ray generator 18.

The presence of the background radiation peak 196 may allow for a further refinement of the gain stabilization of the formation X-ray detector 22 based on the reference peak 148. That is, in addition to the gain stabilization techniques based on the reference peak 148 discussed above, the data processing circuitry 14 may gain-stabilize the formation X-ray detector 24 using the background radiation peak 196. The data processing circuitry 14 may perform such gain stabilization using any suitable technique, including those disclosed by U.S. patent application Ser. No. 12/268,211, "GAIN STABILIZATION OF GAMMA-RAY SCINTILLATION DETECTOR," which is assigned to Schlumberger Technology Corporation and which is incorporated by reference herein in its entirety.

Figure 12:
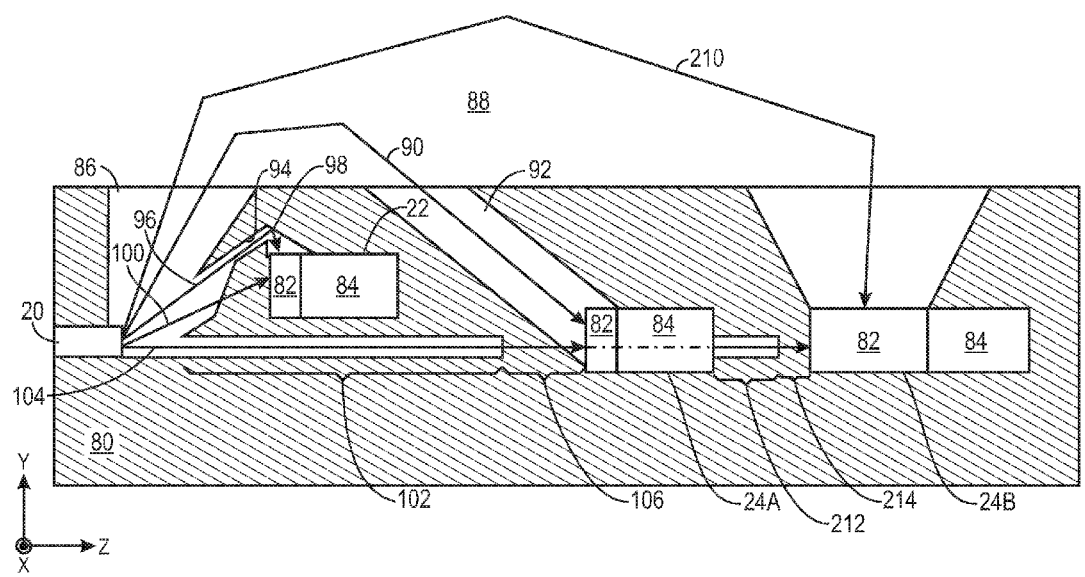
FIG. 12 is a schematic diagram representing a side view of a stabilization channel through the shielding of the downhole tool of FIG. 1 for stabilizing the gain of a reference X-ray detector and two formation X-ray detectors of the downhole tool without a radioisotopic reference source, in accordance with an embodiment.

Furthermore, it should be appreciated that the above-described techniques may apply to downhole tools 12 with more than one formation X-ray detector 24. For example, as shown in FIG. 12, the downhole tool 12 may include additional formation X-ray detectors 24 that remain free of radioisotopic reference sources. For example, in addition to a first formation X-ray detector 24A, the downhole tool 12 may include a second formation X-ray detector 24B. This second formation X-ray detector 24B, like the first formation X-ray detector 24A, may detect X-rays that pass outside of the downhole tool 12 (e.g., through an X-ray path 210), as well as X-rays that pass internally through the downhole tool 12 through channels in the X-ray shielding 80.

In one embodiment, as shown in FIG. 12, X-rays may exit the X-ray target 20 and travel through the gain stabilization channel 102 and through the high pass filter 106 toward the first formation X-ray detector 24A. Because not all of the X-rays passing through the first formation X-ray detector 24 will be detected, some of these X-rays will continue through a second gain-stabilization channel 212 and through a second high pass filter 214 toward a second formation X-ray detector 24B. The second high pass filter 214 may be formed using any suitable amount of X-ray shielding 80, so as to attenuate the reference peak that will be detected in the second formation X-ray detector 24B as a result. Specifically, because the second X-ray detector 24B may detect fewer X-rays from outside of the downhole tool 12 than the first formation X-ray detector 24A, the reference peak for the second X-ray detector 24B may not need to be as great as the reference peak 148 for the first X-ray detector 24A.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole tool comprising:
    an X-ray generator configured to emit a first plurality of X-rays out of the downhole tool and to emit a second plurality of X-rays internally through the downhole tool;
    an X-ray detector configured to detect a subset of the first plurality of X-rays that return to the downhole tool and a subset of the second plurality of X-rays that pass internally through the downhole tool; and
    data processing circuitry configured to gain-stabilize the X-ray detector based at least in part on the subset of the second plurality of X-rays detected by the X-ray detector.

2. The downhole tool of claim 1, wherein the downhole tool is completely free of radioisotopic reference sources.

3. The downhole tool of claim 1, wherein the data processing circuitry is configured to gain-stabilize the X-ray detector based at least in part on an energy peak that results when the X-ray detector detects the subset of the second plurality of X-rays.

4. The downhole tool of claim 3, wherein the data processing circuitry is configured to gain-stabilize the X-ray detector by causing a gain of the X-ray detector to increase or decrease such that the energy peak maintains substantially the same shape over time.

5. The downhole tool of claim 1, wherein the X-ray detector comprises a scintillator that produces detectable background radiation and wherein the data processing circuitry is configured to gain-stabilize the X-ray detector based at least in part on the background radiation of the scintillator.

6. The downhole tool of claim 5, wherein the scintillator comprises Lutetium, Lanthanum, or Bismuth Germanium Oxide, or any combination thereof.

7. The downhole tool of claim 1, comprising an X-ray filter configured to filter some of the second plurality of X-rays to produce the subset of the second plurality of X-rays, wherein the subset of the second plurality of X-rays is configured to have a different average energy than the subset of the first plurality of X-rays, such that an energy peak associated with the subset of the second plurality of X-rays is identifiable over other spectrum associated with the subset of the first plurality of X-rays.

8. The downhole tool of claim 7, wherein the X-ray filter comprises tungsten or lead, or a combination thereof.

9. The downhole tool of claim 7, wherein the X-ray filter comprises a high pass filter.

10. A method comprising:
    generating X-rays using an X-ray generator in a downhole tool;
    detecting, using an X-ray detector in the downhole tool, X-rays that travel internally through the downhole tool from the X-ray generator to the X-ray detector and X-rays that travel through a subterranean formation before reaching the X-ray detector;

causing, using data processing circuitry, a gain of the X-ray detector to be stabilized based at least in part on the detected X-rays that traveled internally through the downhole tool from the X-ray generator to the X-ray detector; and determining, using the data processing circuitry, a property of the formation based at least in part on the detected X-rays that traveled through the subterranean formation before reaching the X-ray detector.

11. The method of claim 10, wherein detecting the X-rays using the X-ray detector comprises detecting substantially only X-rays derived from the X-ray generator.

12. The method of claim 10, wherein detecting X-rays using the X-ray detector comprises detecting substantially no X-rays derived from radioisotopic X-ray sources within the downhole tool.

13. The method of claim 10, wherein the property of the formation comprises a density or a lithology, or a combination thereof.

14. An article of manufacture comprising:
one or more tangible, machine-readable storage media having instructions encoded thereon for execution by a processor, the instructions comprising:
instructions to receive data representing a first X-ray spectrum detected by a formation X-ray detector of a downhole tool, wherein a first portion of the first X-ray spectrum is derived from X-rays that scattered off material surrounding the downhole tool and a second portion of the first X-ray spectrum is derived from X-rays that pass internally through the downhole tool from an X-ray generator without scattering off the material surrounding the downhole tool;
instructions to determine a reference energy peak of the first X-ray spectrum due at least in part to the second portion of the first X-ray spectrum; and
instructions to stabilize a gain of the formation X-ray detector based at least in part on the reference energy peak of the first X-ray spectrum.

15. The article of manufacture of claim 14, comprising instructions to divide the reference energy peak of the first X-ray spectrum into a plurality of windows defined around the reference energy peak of the first X-ray spectrum.

16. The article of manufacture of claim 15, wherein the instructions to stabilize the gain of the formation X-ray detector comprise instructions to cause the gain of the formation X-ray detector to increase or decrease, or a combination thereof, such that a first of the plurality of windows on one side of the reference energy peak of the first X-ray spectrum includes an approximately equal number of X-ray counts as a second of the plurality of windows on one side of the reference energy peak of the first X-ray spectrum.

17. The article of manufacture of claim 15, wherein the instructions to stabilize the gain of the formation X-ray detector comprise instructions to cause the gain of the formation X-ray detector to increase or decrease, or a combination thereof, such that the following relationship is equal to approximately 0:

$$\frac{\left(S2 - \frac{S1-S4}{3}\right) - S3}{\left(S2 - \frac{S1-S4}{3}\right) + S3}.$$

where S1, S2, S3, and S4 each represent one of the plurality of windows defined around the reference energy peak of the first X-ray spectrum.

18. The article of manufacture of claim 14, comprising instructions to receive data representing a second X-ray spectrum detected by a reference X-ray detector of the downhole tool, wherein a first portion of the second X-ray spectrum is derived from X-rays that fluoresce off X-ray shielding within the downhole tool and a second portion of the second X-ray spectrum is derived from X-rays that pass internally through the downhole tool from an X-ray generator without scattering off the material surrounding the downhole tool.

19. The article of manufacture of claim 18, comprising instructions to divide two energy peaks of the second X-ray spectrum that respectively derive from the first portion and the second portion of the second X-ray spectrum, respectively, into a first plurality of windows and a second plurality of windows.

20. The article of manufacture of claim 19, comprising instructions to stabilize a gain of the reference X-ray detector by causing the gain of the reference X-ray detector to increase or decrease, or a combination thereof, such that the following relationships are equal to approximately 0:

$$\frac{p_1 - p_2}{p_1 + p_2}$$

and $$\frac{p_3 - p_4}{p_3 + p_4},$$

where p1 and p2 each represent one of the first plurality of windows and p3 and p4 each represent one of the second plurality of windows.

21. The article of manufacture of claim 19, comprising instructions to stabilize an output of the X-ray generator by adjusting a voltage of the X-ray generator based at least in part on the following relationship:

$$\frac{p_3 + p_4}{p_1 + p_2},$$

where p1 and p2 each represent one of the first plurality of windows and p3 and p4 each represent one of the second plurality of windows.

22. The article of manufacture of claim 19, comprising instructions to stabilize an output of the X-ray generator by adjusting a voltage and a beam current of the X-ray generator based at least in part on the following relationships:

$$\{p_1+p_2, p_3+p_4\} \text{ and } \{\text{accelerator voltage,beam current}\},$$

where p1 and p2 each represent one of the first plurality of windows and p3 and p4 each represent one of the second plurality of windows.

23. The article of manufacture of claim 18, comprising instructions to stabilize an output of the X-ray generator by adjusting a beam current of the X-ray generator based at least in part on a total number of counts measured by the reference X-ray detector.

24. A system comprising:
- a sourceless downhole tool free of radioisotopic reference sources, the sourceless downhole tool being configured to emit X-rays into a formation using an X-ray generator and to detect a subset of the X-rays that scatter off the formation and return to the downhole tool using an X-ray detector; and
- data processing circuitry configured to gain-stabilize the X-ray detector based at least in part on reference X-rays from the X-ray generator that did not scatter off the formation.

25. The system of claim 24, wherein the sourceless downhole tool comprises a channel through X-ray shielding configured to permit the reference X-rays to pass internally through the downhole tool from the X-ray generator to the X-ray detector.

26. The system of claim 24, wherein the channel through the X-ray shielding comprises a collimating element to collimate the reference X-rays to prevent internal reflection of the reference X-rays within the channel.

* * * * *